(12) United States Patent
Kim

(10) Patent No.: US 7,095,888 B2
(45) Date of Patent: Aug. 22, 2006

(54) APPARATUS FOR DETECTING AVERAGE PICTURE LEVEL

(75) Inventor: Kye Young Kim, Anyang (KR)

(73) Assignee: LG Electronics Inc., Seoul (KR)

( * ) Notice: Subject to any disclaimer, the term of this patent is extended or adjusted under 35 U.S.C. 154(b) by 703 days.

(21) Appl. No.: 10/379,128

(22) Filed: Mar. 4, 2003

(65) Prior Publication Data

US 2003/0164810 A1     Sep. 4, 2003

(30) Foreign Application Priority Data

Mar. 4, 2002    (KR) .................. 10-2002-0011410

(51) Int. Cl.
*G06K 9/00*    (2006.01)

(52) U.S. Cl. .................. 382/162; 382/274; 382/272; 345/63; 345/690

(58) Field of Classification Search ............. 382/162, 382/167, 169, 274, 272, 189, 214; 345/20, 345/60, 63, 88–89, 690

See application file for complete search history.

(56) References Cited

U.S. PATENT DOCUMENTS

2003/0234753 A1* 12/2003 Tanaka .................. 345/67

2004/0201562 A1* 10/2004 Funamoto et al. ............. 345/89

FOREIGN PATENT DOCUMENTS

WO    WO 00/17845    3/2000

* cited by examiner

*Primary Examiner*—Jingge Wu
*Assistant Examiner*—Ali Bayat
(74) *Attorney, Agent, or Firm*—Lee, Hong, Degerman, Kang & Schmadeka

(57) ABSTRACT

An apparatus for detecting average picture level (APL) which is able to prevent non-linear property of APL used to control image and power in a PDP system, to calculate linear APL value, and to calculate gain value automatically, comprises: a pre-processing unit for summing image data of one frame, multiplying the summed value by weight corresponding to a size of pixel, and outputting the data multiplied by the weight; an average calculating unit for summing upper bits of the data outputted from the pre-processing unit and outputting the summed value as an average value; a gain calculating unit for calculating gain for obtaining maximum APL value based on the average value outputted from the average calculating unit; and an APL outputting unit for multiplying the gain obtained from the gain calculating unit by the average value outputted from the average calculating unit, and outputting the multiplied value as a final APL value.

4 Claims, 3 Drawing Sheets

APPARATUS FOR DETECTING AVERAGE PICTURE LEVEL

BACKGROUND OF THE INVENTION

1. Field of the Invention

The present invention relates to a plasma display panel (PDP) system (for example, plasma display), and particularly, to an apparatus for detecting average picture level applied to the PDP system.

2. Description of the Background Art

Generally, in a PDP system, an apparatus for detecting average picture level (APL) is mainly used for realizing a picture of high quality using Human's sight. Especially, Weber-Fechner principle shows that the human sight has higher brightness judgement, but has lower brightness judgement in dark area.

The above APL is a method for realizing gradation display visually at every frames as considering relation of data, which will be displayed on a screen, with neighboring pixels regardless of that the data is dark image data or bright image data, and aims to maintain power consumption constantly at every frames when the image is displayed on the screen. Also, the APL is defined as a numerical value obtained by averaging gradation levels of cells. For example, if black color is displayed on a full screen, then the APL is 0%, and if white highest gradation level (255) is displayed on the full screen, the APL is 100%. The APL of typical images is about 30~40% in average.

FIG. 1 is a block diagram showing a structure of an APL detecting apparatus according to the conventional art.

As shown therein, the APL detecting apparatus according to the conventional art comprises: a red color data summing unit 11 for summing red color data corresponding to red colors among image data of one frame; a green color data summing unit 12 for summing green color data corresponding to green color among the image data; a blue color data summing unit 13 for summing blue color data corresponding to blue color among the image data; a multiplying unit 14 for multiplying summed red color data value by weight corresponding to size of red color pixel; a multiplying unit 15 for multiplying summed green color data value by weight corresponding to size of green color pixel; a multiplying unit 16 for multiplying summed blue color data value by weight corresponding to size of blue color pixel; a summing unit 17 for summing up the red, green and blue data values multiplied by the weight, averaging the summed red, green and blue color data values, and outputting the averaged data values; and an APL outputting unit 18 for outputting an APL value by multiplying the averaged data by a pre-decided gain for making 255 gradation. Herein, the image data of one frame corresponding to an input video signal comprises data corresponding to red, green and blue colors, and pixels of the PDP are controlled by the three colors data to display the image on the screen. In addition, the three-color data have maximum 255 gradation value. Hereinafter, operations of the APL detecting apparatus according to the conventional art will be described as follows.

First, the summing units 11~13 sum the respective data corresponding to the red, green and blue color pixels among the image data of one frame, and output the summed red, green and blue color data to the multiplying units 14~16.

The multiplying units 14~16 multiply the sums of red, green and blue color data of video format (for example, 640×480 resolution) by weights corresponding to the sizes of red, green and blue color pixels in order to reflect affects according to the pixel sizes, and output the multiplied values to the summing unit 17. Herein, since the brightness and power consumption of the red, green and blue color pixels of the PDP are different from each other, the size of respective pixel may be changed in order to compensate the brightness and power consumption of the pixel.

After that, the summing unit 17 sums the red, green and blue color data values multiplied by the weights, averages the summed data values, and outputs the averaged value to the APL outputting unit 18 as an average value.

The APL outputting unit 18 multiplies the average value outputted from the summing unit 17 by gain value, which is set in advance for compensating error generated during calculating binary average value, to make the APL value maximum (100%) in case that the input data is the data representing only white color. Herein, the gain is a value which is set in advance in order to make the average value 255 gradation value.

However, according to the APL detecting apparatus of the conventional art, the average value outputted from the summing unit 17 is changed by characteristics of red, green and blue color pixels, sizes of the pixels and illuminating property of the pixel according to that the input video format (for example, resolution) is changed variously, and thereby the gain value should be controlled according to the change. However, it is difficult to control the gain value which is set in advance. That is, according to the PDP system of the conventional art, a panel having a structure suitable for the video format is fabricated, and sizes and color temperatures of respective red, green and blue color pixels are different from each other. Therefore, in calculating the APL value, the weights multiplied with the red, green and blue color data are different, and accordingly, the average value is also changed. Thus, a lot of gain values suitable for the average values are needed in one video format.

Also, in case that the APL value which is the final value outputs larger changing value than that of the input data, that is, input/output wave forms are non-linear, the screen can be flickered. For example, when error value of 1 bit is generated during the input video signal is converted into pixel-by-pixel digital image data, and flickering of PDP screen is shown remarkably.

SUMMARY OF THE INVENTION

Therefore, an object of the present invention is to provide an apparatus for detecting average picture level (APL) which is able to prevent non-linear property of average picture level used for controlling image and power consumption in a plasma display panel (PDP) system, to calculate linear APL value, and to calculate gain value automatically.

Also, another object of the present invention is to provide an apparatus for detecting APL which is able to prevent flickering phenomenon of PDP screen by calculating linear APL value and gain value automatically.

To achieve these and other advantages and in accordance with the purpose of the present invention, as embodied and broadly described herein, there is provided an apparatus for detecting APL comprising: a pre-processing unit for summing image data of one frame, multiplying the summed value by weight corresponding to a size of pixel, and outputting the data multiplied by the weight; an average calculating unit for summing upper bits of the data outputted from the pre-processing unit and outputting the summed value as an average value; a gain calculating unit for calculating gain for obtaining maximum APL value based on the average value outputted from the average calculating unit; and an APL outputting unit for multiplying the gain obtained from the gain calculating unit by the average value outputted from the average calculating unit, and outputting the multiplied value as a final APL value.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
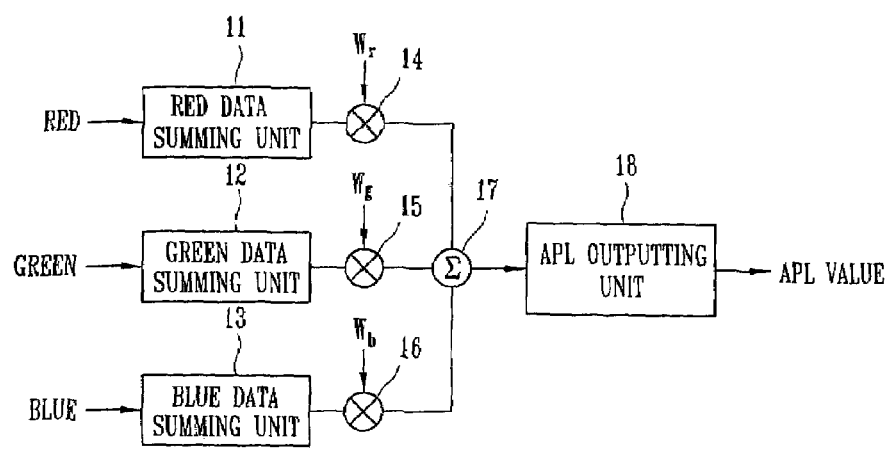
FIG. 1 is a block diagram showing a structure of an APL detecting apparatus according to the conventional art.
Figure 2:
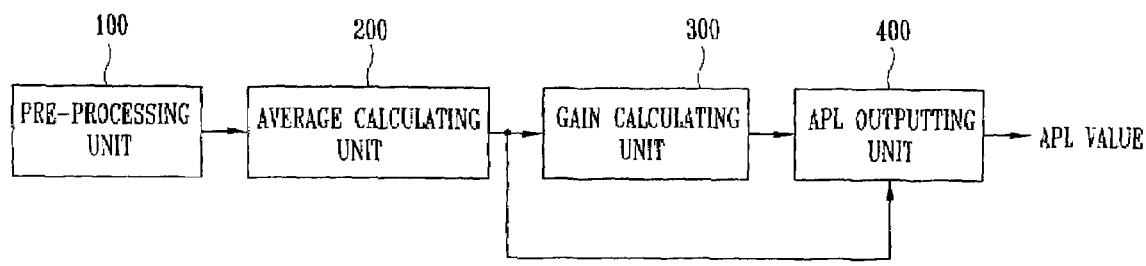
FIG. 2 is a block diagram showing a structure of an APL detecting apparatus according to the present invention.

FIG. 2 is a block diagram showing a structure of a linear average picture level (APL) detecting apparatus according to the present invention.

As shown therein, the linear APL detecting apparatus comprises: a preprocessing unit 100 for summing image data of one frame, multiplying the summed value by weight corresponding to size of red, green and blue pixels, and outputting the data multiplied by the weight; an average calculating unit 200 for summing upper bits of the data outputted from the pre-processing unit and outputting the summed value as an average value; a gain calculating unit 300 for calculating gain to obtain maximum APL value for linear and white input based on the average value outputted from the average calculating unit 200; and an APL outputting unit 400 for multiplying the gain obtained from the gain calculating unit 300 by the average value outputted from the average calculating unit 200, and outputting the multiplied value as a final APL value. Herein, the image data of one frame corresponding to the input video signal comprise data corresponding to red, green and blue colors, and the data of three colors control the pixels of PDP to display an image, and the data of three colors have maximum 255 gradation value.

Hereinafter, structures of the pre-processing unit 100 and of the average calculating unit 200 will be described with reference to FIG. 3 in more detail.

Figure 3:
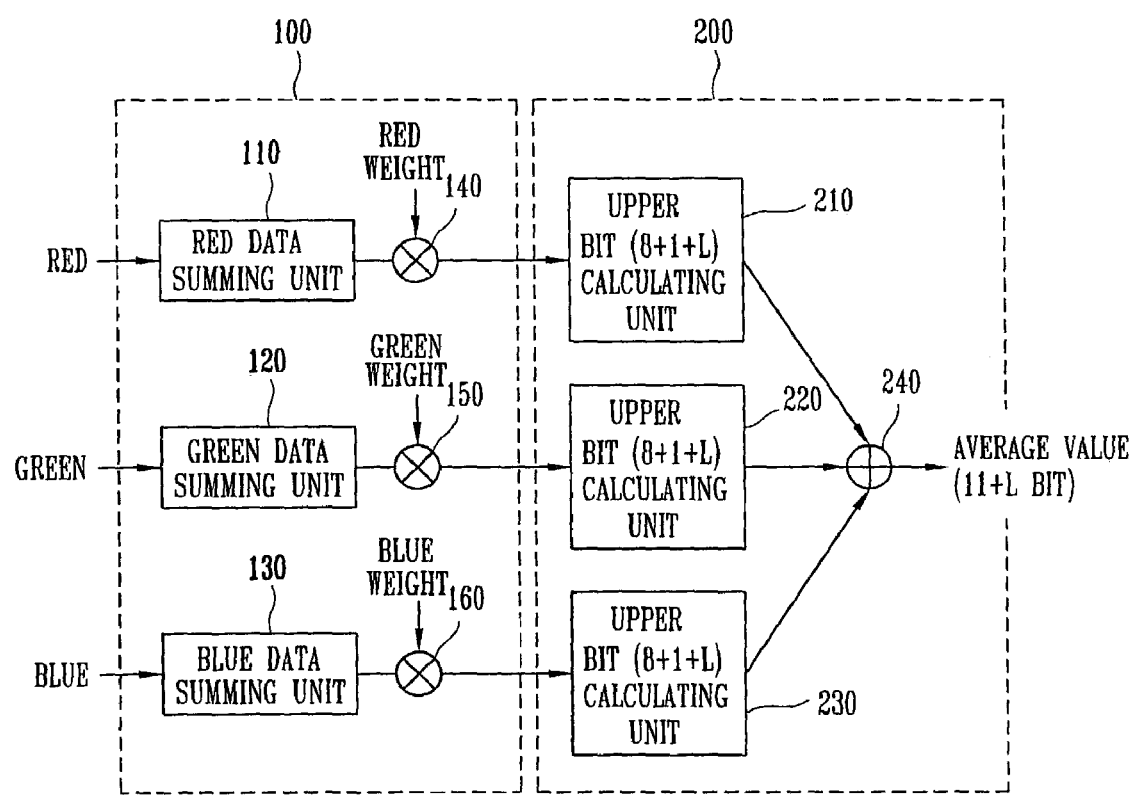
FIG. 3 is a block diagram showing structures of a pre-processing unit and an average calculating unit in FIG. 2 in detail.

FIG. 3 is a block diagram showing the structures of the pre-processing unit and the average calculating unit shown in FIG. 2 in detail.

As shown therein, the pre-processing unit 100 comprises: a red data summing unit 110 for summing red color data (data driving red color pixels) corresponding to the red color among the image data of the one frame; a green data summing unit 120 for summing green color data (data driving green color pixels) corresponding to the green color among the image data of the one frame; a blue data summing unit 130 for summing blue color data (data driving blue color pixels) corresponding to the blue color among the image data of the one frame; a multiplying unit 140 for multiplying the summed red data value by weight corresponding to the size of red color pixel; a multiplying unit 150 for multiplying the summed green data value by weight corresponding to the size of green color pixel; and a multiplying unit 160 for multiplying the summed blue data value by weight corresponding to the size of blue color pixel. That is, the pre-processing unit 100 comprises: summing units 110, 120 and 130 for summing red, green and blue data of the respective pixels making an image of one frame; and multiplying units 140, 150 and 160 for multiplying the values summed in the summing units 110, 120 and 130 by the weights corresponding to the sizes of red, green and blue color pixels. Herein, the respective pixel making the image of one frame is made by red, green and blue gradation.

As shown in FIG. 3, the average calculating unit 200 comprises: an upper bit calculating unit 210 for outputting effective upper bit (8+1+L) among bits corresponding to the red data values multiplied by the weight in the multiplying unit 140; an upper bit calculating unit 220 for outputting effective upper bit (8+1+L) among bits corresponding to the green data values multiplied by the weight in the multiplying unit 150; an upper bit calculating unit 230 for outputting effective upper bit (8+1+L) among bits corresponding to the blue data values multiplied by the weight in the multiplying unit 160; and a summing unit 240 for summing the effective upper bits (8+1+L) of the red, green and blue color data values and outputting the summed value (11+L) into the gain calculating unit 300 as an average value. That is, the average calculating unit 200 comprises: upper bit calculating units 210, 220 and 230 for outputting effective upper bits (8+1+L) among the bits corresponding to the red, green and blue color data values multiplied by the weights in the multiplying units 140, 150 and 160; and a summing unit 240 for summing up the effective upper bits (8+1+L) of the red, green and blue data values and outputting the summed value (11+L) as an average value.

Hereinafter, operations of the pre-processing unit 100 and the average calculating unit 200 will be described in detail.

The summing units 110, 120 and 130 of the pre-processing unit 100 sum the red, green and blue data corresponding to the image data of one frame, and output the summed data to the multiplying units 140, 150 and 160.

The multiplying units 140, 150 and 160 multiplies the values summed in the summing units 110, 120 and 130 by the weights corresponding to the sizes of red, green and blue colors, and output the multiplied values to the average calculating unit 200. Herein, the weights of the three colors can be varied from the characteristic of the PDP. That is, the weights of the three colors are changed according to the sizes of red, green and blue color pixels.

The upper bit calculating units 210, 220 and 230 of the average calculating unit 200 output effective upper bits (8+1+L) among the bits corresponding to the red, green and blue color data values multiplied by the weights in the multiplying units 140, 150 and 160. That is, the upper bit calculating units 210, 220 and 230 of the average calculating unit 200 output the values same as values obtained by dividing the red, green and blue data values multiplied by the weights by input image format (N×N), that is, the above data (8+1+L bit). Herein, the input image format (N×N) is inputted from the outer side.

For example, if the format input signal is 3 bits, "000" is 640×480, "001" is 852×480, "010" is 1024×768, "011" is 1280×720 and "100" is 1366×768. Also, in above "(8+1+L)", "8" means 8 bits when the final APL value is decided to be 255 gradation. Above "1" means integer 1 bit in the weight of pixel (between 0.5~1.5). In addition, when a user inputs the weights of the red, green and blue color pixels (0.5~1.5) as binary numbers, for example, the weight of blue color is 1.25 and the user inputs 1.25 in binary numbers, it can be presented as binary number 1 representing the integer 1 and binary number 0.01 ($=0\times 2^{-1}+1\times 2^{-2}=0.25$) representing decimal 0.25, and at that time, "L" is 2 bits since the L is decimal number. Of course, the weights of the red and green color pixels can be represented in same way as that of the blue color pixel, and if the weights of the red and green color pixels have more decimal digit in binary number than that of the weight of blue color pixel, the decimal digit is decided as the L value. Therefore, the effective upper bit (8+1+L) is decided according to the format of input image, and can be changed according to the weights of the three color pixels. For example, when the format of input image is N×N resolution (for example, 640×480) and 255 gradation (8 bits), the binary digits as much as log2 (N×M×255) are needed, and then, 27 bits is outputted as the final value when calculating the 640×480×255 gradation. Also, since the weight of the pixel is the value between 0.5~1.5 generally, the binary number of above value can be represented integer 1 bit and decimal L bit. Herein, the weight is increased as the size of pixel is increased.

Therefore, the upper bit calculating units 210, 220 and 230 of the average calculating unit 200 output only the effective upper bits (8+1+L) among the log2 (N×M×255) bits without an additional calculating process for obtaining the average value (11+L bit), which is the input value of the APL outputting unit 400 for calculating the final APL value. That is, the upper bit calculating units 210, 220 and 230 output the effective upper bit (8+1+L) among the bits corresponding to the red, green and blue color data values multiplied by the weights in the multiplying units 140, 150 and 160 to the summing unit 240.

The summing unit 240 of the average calculating unit 200 sums the effective upper bits (8+1+L) outputted respectively from the upper bit calculating units 210, 220 and 230, and outputs the summed value (11+L) to the gain calculating unit 300 as an average value. Herein, when the upper bit for respective color (8+1+L=9+L) is summed three times, 2 bits are increased, and therefore, 11+L bits is outputted as the average value. For example, maximum value of 8+1=9 bits is $2^9-1=511$ in decimal numeral, and sum of the maximum values (8+1=9 bits) for the red, green and blue color data becomes 511×3=1533. Therefore, at least 11 bits are required in order to present 1533 in binary number (for example, $2^{10}=1024$, $2^{11}=2048$). Thus, the data for representing the sum of red, green and blue color data for the (8+1+L) bit is (11+L) bit as increasing 2 bits.

On the other hand, the average value can not be estimated according to the changing weights (format is one of changeable element with the weight since the input video signal format can affect to the average value) according to the conventional art, and also, it is difficult to calculate the gain which makes the APL value, which will be outputted, maximum APL value when the white color image is inputted. However, the gain calculating unit 300 according to the present invention is able to calculate the maximum APL value precisely by back-tracking the gain according to the maximum APL value which is decided in advance. That is, the gain calculating unit 300 calculates the gain for making 255 value corresponding to 100% APL value outputted from the APL outputting unit 400 when the input image is white color, since the average value outputted from the average calculating unit 200 is not 255 value when the input image is white color, and the APL outputting unit 400 outputs 255 value corresponding to 100% APL based on the gain and the average value outputted from the average calculating unit 200 when the input image is white color. Herein, since the average value of the average calculating unit 200 can be varied from the weights of FIG. 3, the gain value which is changed automatically according to the changes of average value is obtained in the gain calculating unit 300, and the gain value is outputted to the APL outputting unit 400.

Hereinafter, operations of the gain calculating unit 300 will be described in detail with reference to FIG. 4.

Figure 4:
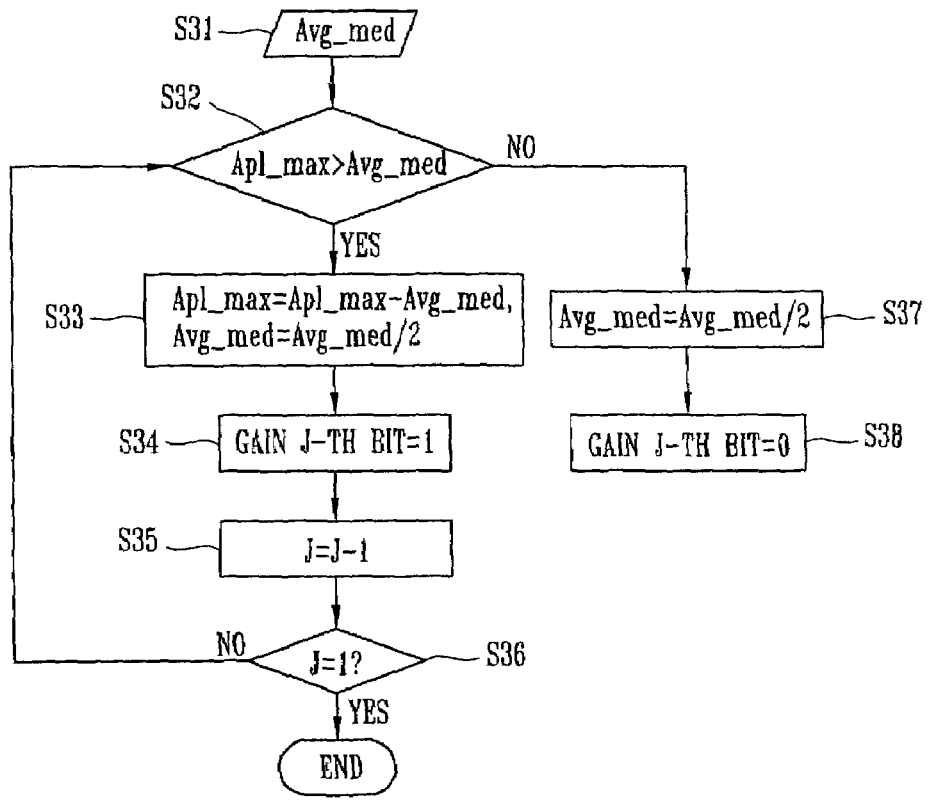
FIG. 4 is a flow chart illustrating automatic gain calculating method performed in a gain calculating unit in FIG. 2.

FIG. 4 is a flow chart illustrating automatic gain detecting method performed in the gain calculating unit in FIG. 2.

As shown therein, the gain calculating unit 300 is applied by the automatic gain calculating method. That is, the automatic gain calculating method comprises: a step of comparing average value (Avg_med) (11+L) outputted from the average calculating unit 200 to the maximum APL value (Apl_max) which is set in advance (S31 and S32); a step of updating the pre-set maximum APL value by subtracting the average value (Avg_med) (11+L) from the maximum APL value (Apl_max) when the maximum APL value is larger than the average value (Avg_med) (11+L), and updating the average value by dividing the average value (Avg_med)(11+L) by 2 (S33); a step of setting J-th bit of the gain (highest bit) as 1; a step of updating the average value by dividing the average value (Avg_med) (11+L) by 2 when the maximum APL value (Apl_max) is smaller than the average value (Avg_med) (11+L) and setting the J-th bit of the gain (highest bit) as 0 (S37 and S38); a step of decreasing parameter, which represents the entire number of bits in the gain, as much as 1 after performing the steps S37 and S38; and a step of deciding whether or not the parameter decreased as much as 1 is same as the 1 (lowest bit), returning to step S32 if the parameter is not same as the lowest bit and ending the gain detecting process if the parameter is same as the lowest bit (S36).

Herein, if the pre-set maximum APL value is Apl_max and N bit value, the average value is Avg_med and 11+L bits, even though the average value (Avg_med) is smaller than the maximum APL value (Apl_max), the binary digit (11+L) is larger than N value. Also, the number of bits of the gain which will be calculated is J bit. Herein, it is desirable that the J bit uses 8 bits. Also, J representing the parameter and digit is decreased one by one from 8 to 1 during the gain value calculating process, and when the J becomes 1, the calculating process is ended. In addition, the Apl_max value is used as 255 gradation level, and therefore, N bit becomes 8 bits.

Therefore, the gain calculating unit 300 updates the pre-set maximum APL value by subtracting the average value from the pre-set maximum APL value when the pre-set maximum APL value is larger than the average value by comparing the average value outputted from the average calculating unit 200 to the pre-set maximum APL value. Also, the gain calculating unit 300 updates the average value by dividing the average value by 2 when the pre-set maximum APL value is larger than the average value by comparing the average value outputted from the average calculating unit 200 to the pre-set maximum APL value.

After that, the gain calculating unit 300 sets the J-th bit of the gain as 1, decreases parameter (J) representing entire bit number of the gain as much as 1, and suspends the calculating process when the J is 1 by deciding whether or not the J is 1. That is, when the bits from the highest (J) to the lowest are "1", the gain calculating unit 300 suspends the gain calculating process. Also, the gain calculating unit 300 divides the average value by 2 and sets the J-th bit of the gain to be 0 when the pre-set maximum APL value is smaller than the average value, and after that, performs steps S32~S36 repeatedly. Hereinafter, structure and operation of the APL outputting unit 400 will be described in detail with reference to FIG. 5.

Figure 5:
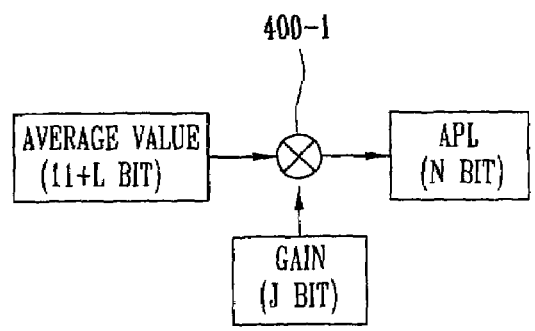
FIG. 5 is a block diagram showing a structure of an APL outputting unit in FIG. 2 in detail.

FIG. 5 is a block diagram showing the structure of the APL outputting unit shown in FIG. 2 in detail.

As shown therein, the APL outputting unit 400 comprises a multiplying unit 400-1 for multiplying the gain value calculated from the gain calculating unit 300 by the average value calculated in the average calculating unit 200 and outputting the multiplied value as a final APL value. That is, when the gain value calculated in the gain calculating unit 300 is multiplied by the average value calculated in the average calculating unit 200, the APL value having linear delivery property between input value and output value is obtained. For example, when the average value of 11+L bit is multiplied by the J bit gain in FIG. 5, 11+2(L)+8(J)=21 bits value is obtained since the L value is 2 bits, J value is 8 bits and N value is 8 bits, and upper 8(N) bits is used as the result value in the 11+2(L)+8(J)=21 bits.

As described above, according to the present invention, the input picture is divided by resolutions to obtain average value, and the APL value and the gain value are found and processed automatically. Thereby, the input gradation which is wanted to be realized can be represented by the linear delivery characteristic, and the brightness of entire screen can be represented without noise.

Also, if the APL detecting apparatus according to the present invention is applied to the PDP system, the flickering phenomenon of the screen can be prevented, and therefore, the power consumption can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for detecting average picture level (APL) comprising:
    a pre-processing unit for summing image data of one frame, multiplying the summed value by weight corresponding to a size of pixel, and outputting the data multiplied by the weight;
    an average calculating unit for summing upper bits of the data outputted from the pre-processing unit and outputting the summed value as an average value;
    a gain calculating unit for calculating gain for obtaining maximum APL value based on the average value outputted from the average calculating unit; and
    an APL outputting unit for multiplying the gain obtained from the gain calculating unit by the average value outputted from the average calculating unit, and outputting the multiplied value as a final APL value.

2. The apparatus of claim 1, wherein the pre-processing unit comprises:
    a summing unit for summing red, green and blue color data of respective pixels making an image of one frame; and
    a multiplying unit for multiplying the value summed in the summing unit by weights corresponding to sizes of red, green and blue color pixels.

3. The apparatus of claim 1, wherein the average calculating unit sums effective upper bits among the bits corresponding to the red, green and blue data values, and outputs the summed value to the gain calculating unit as an average value.

4. The apparatus of claim 1, wherein the gain calculating unit compares average value outputted from the average calculating unit to maximum APL value which is set in advance (a); updates the pre-set maximum APL value by subtracting the average value from the maximum APL value when the maximum APL value is larger than the average value, updates the average value by dividing the average value by 2, and sets J-th bit of the gain (highest bit) as 1 (b); updates the average value by dividing the average value by 2 when the maximum APL value is smaller than the average value and sets the J-th bit of the gain (highest bit) as 0 (c); decreases parameter, which represents the entire number of bits in the gain, as much as 1 after performing (b) or (c), returns to (a) step if the parameter is not same as 1, and suspends the gain detecting process if the parameter is same as 1 (d).

* * * * *